United States Patent
Weidemann

(10) Patent No.: US 10,619,513 B2
(45) Date of Patent: Apr. 14, 2020

(54) STEAM TURBINE INNER CASING COMPONENT AND REPAIR METHOD THEREFOR

(71) Applicant: General Electric Technology GmbH, Baden (CH)

(72) Inventor: Kornelia Weidemann, Baden (CH)

(73) Assignee: General Electric Technology GmbH, Baden (CH)

( * ) Notice: Subject to any disclaimer, the term of this patent is extended or adjusted under 35 U.S.C. 154(b) by 318 days.

(21) Appl. No.: 15/434,423

(22) Filed: Feb. 16, 2017

(65) Prior Publication Data

US 2017/0234162 A1 Aug. 17, 2017

(30) Foreign Application Priority Data

Feb. 17, 2016 (EP) .................................... 16156087

(51) Int. Cl.
| | | |
|---|---|---|
| *F01D 25/24* | (2006.01) | |
| *B23K 35/30* | (2006.01) | |
| *F01D 5/00* | (2006.01) | |
| *B32B 15/01* | (2006.01) | |
| *F01D 11/08* | (2006.01) | |

(Continued)

(52) U.S. Cl.
CPC ............ *F01D 25/24* (2013.01); *B23K 35/308* (2013.01); *B23K 35/3053* (2013.01); *B23K 35/3086* (2013.01); *B32B 15/011* (2013.01); *F01D 5/005* (2013.01); *F01D 11/08* (2013.01); *F01D 25/005* (2013.01); *B23K 2101/001* (2018.08);

(Continued)

(58) Field of Classification Search
CPC .......... F01D 25/24; F01D 5/005; F01D 11/08; F01D 25/005; F01D 25/007; B23K 35/3053; B23K 35/308; B23K 35/3086; B23K 2101/001; B32B 15/011; B32B 15/01; F05D 2220/31; F05D 2230/232; F05D 2230/90; F05D 2300/111;

(Continued)

(56) References Cited

U.S. PATENT DOCUMENTS

| | | | |
|---|---|---|---|
| 4,609,577 A | 9/1986 | Long | |
| 4,897,519 A * | 1/1990 | Clark | ..................... B23K 9/046 |
| | | | 219/76.14 |

(Continued)

FOREIGN PATENT DOCUMENTS

| | | |
|---|---|---|
| CA | 894713 A | 3/1972 |
| DE | 30 30 924 A1 | 4/1982 |
| WO | 2015/121936 A1 | 8/2015 |

OTHER PUBLICATIONS

Austenitic Manganese Steels. Key to Metals AG, 2019 [retrieved on Mar. 14, 2019]. Retrieved from the Internet <URL: https://www.totalmateria.com/page.aspx?ID=CheckArticle&site=kts&NM=69>. (Year: 2019).*

(Continued)

*Primary Examiner* — Kayla McCaffrey
(74) *Attorney, Agent, or Firm* — Charlotte C. Wilson; James W. Pemrick

(57) ABSTRACT

Embodiments of the present invention relate to an inner casing component configured to form part of a steam flow path of a last stage of an axial flow steam turbine, the steam turbine inner casing component having a base made of nodular cast iron and a coating, on the base, in a region exposed to the steam flow path, consisting of manganese austenitic steel.

6 Claims, 1 Drawing Sheet

(51) Int. Cl.
*F01D 25/00* (2006.01)
*B23P 6/00* (2006.01)
*B23K 101/00* (2006.01)

(52) U.S. Cl.
CPC .......... *B23P 6/007* (2013.01); *F05D 2220/31* (2013.01); *F05D 2230/232* (2013.01); *F05D 2230/90* (2013.01); *F05D 2300/111* (2013.01); *F05D 2300/132* (2013.01); *F05D 2300/171* (2013.01)

(58) Field of Classification Search
CPC ......... F05D 2300/132; F05D 2300/171; B23P 6/002; B23P 6/007
USPC .............................................. 415/173.1, 200
See application file for complete search history.

(56) References Cited

U.S. PATENT DOCUMENTS

| | | | |
|---|---|---|---|
| 5,735,045 A | 4/1998 | Papayoti | |
| 6,860,718 B2* | 3/2005 | Suzuki | F01D 5/225 415/173.5 |
| 2004/0258192 A1* | 12/2004 | Angeliu | B82Y 30/00 376/305 |
| 2008/0213091 A1* | 9/2008 | Lageder | F01D 25/26 415/209.3 |
| 2009/0308847 A1* | 12/2009 | Kamimura | B23K 15/0086 219/76.1 |

OTHER PUBLICATIONS

"Weldability of materials—Cast Irons," Retrieved from Internet URL: http://www.twi-global_com/technical-knowledge/job-knowledge/weldability-of-materials-cast-irons-025/, on Aug. 8, 2017, pp. 4.

Atta, A. J. M., "Reparing of Turbine Inner Case by Manual Metal Arc Welding," Diyala Journal of Engineering Sciences, First Engineering Scientific Conference College of Engineering, pp. 138-147 (Dec. 22-23, 2010).

Extended European Search Report and Opinion issued in connection with corresponding EP Application No. 16156087.5 dated Aug. 19, 2016.

* cited by examiner

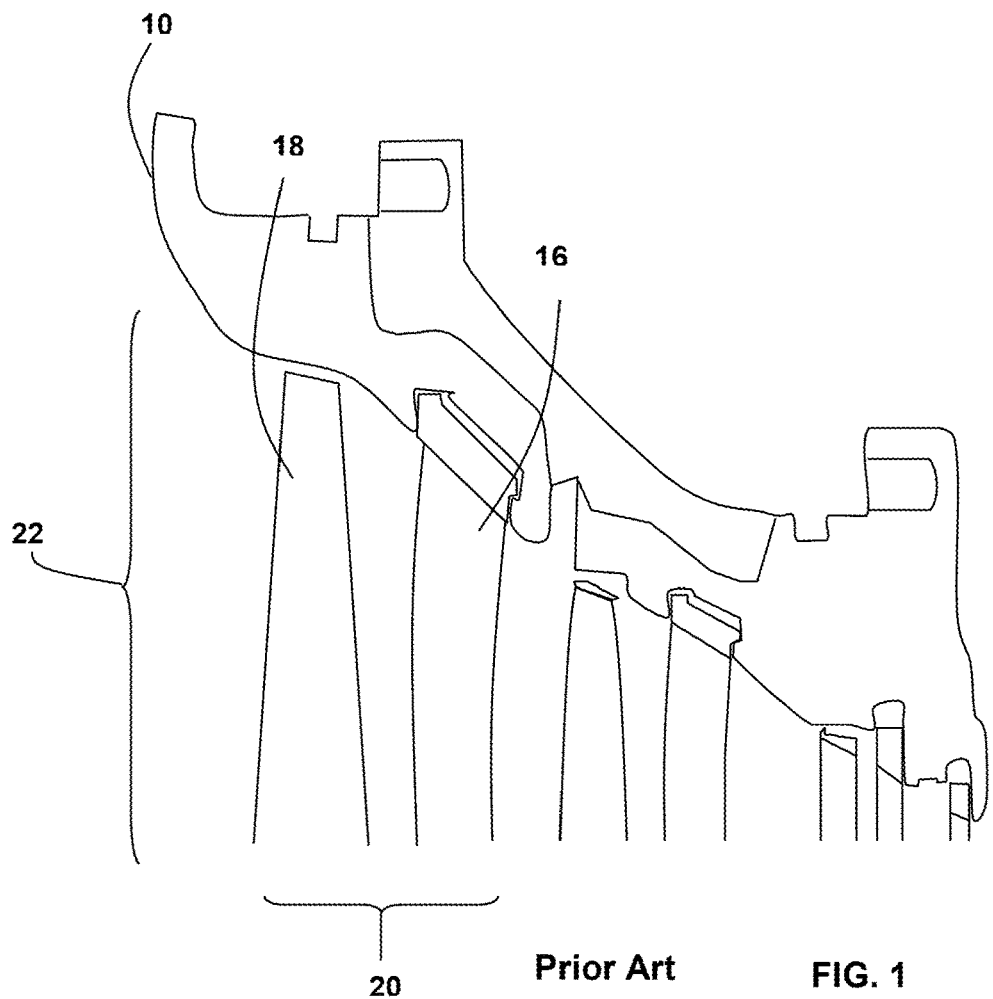
Prior Art    FIG. 1
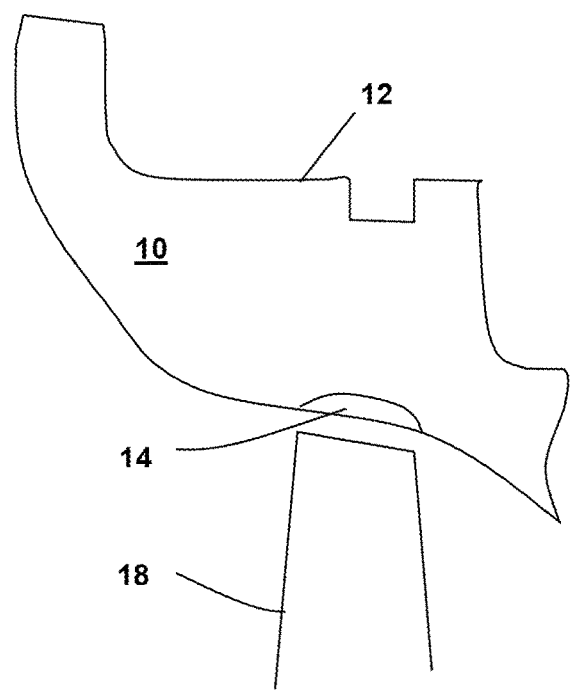
FIG. 2

STEAM TURBINE INNER CASING COMPONENT AND REPAIR METHOD THEREFOR

TECHNICAL FIELD

The present disclosure relates generally to steam turbine inner casing components and more specifically to the material composition, construction and repair methods therefor.

BACKGROUND

Nodular Cast Iron, such as ductile case iron grade GGG40 (DIN), is a common material used to manufacture some inner casings of low pressure steam turbines used in power generation. Such machines may overtime experience water droplet erosion in their inner casings, in particular in regions diagonally opposite the tip of last stage rotating blades where condensed steam is typically centrifuged from the last stage blades to the inner casing at the tip region of the last stage blade so as to impact and erode the inner casing. While the same phenomena may occur at other upstream turbine stages, the problem is greatest at the last stage as this region typically has the highest concentration of condensation.

The erosion reduces the casing wall thickness, which may necessitate repair of the surface. It is generally accepted that materials erosion resistance generally increases with increasing hardness and brittleness. While such materials can be applied by means of laser depositing methods, as welding deposition is generally faster and less expensive, it may be beneficial to use welding deposition method. However, hard and brittle material and are generally difficult to form and are either difficult or impossible to weld.

An alternative to laser deposition involves the fitting of an erosion protection ring which is inserted into a region of the inner casing most effected by the erosion. As the ring material is not limited by the limitations of welding, the ring may be made of ferritic steel having greater resilience to water droplet erosion than nodular cast iron, thus significantly increasing the life of the inner casing. However, while having some advantages, the method may be more expensive than a suitable welding alternative—if developed—and further has the same disadvantage as laser deposition methods of having a longer repair/installation time than welding methods.

A known material suitable for weld repair is work hardening stainless steels. The advantage of this type of material is that, when applied, it may have a hardness of 200 Brindell, making it suitable for welding. Nonetheless, under severe impact and/or compressive abrasion, the hardness of the material may be increased to 500 Brindell. Up until now, it was believed that conditions with a steam turbine would not provide the required cold work hardening of the material, thus leaving the material susceptible to abrasion and erosion.

BRIEF DESCRIPTION

Provided is a formulation of and a manufacturing method for a nodular cast iron low pressure steam turbine inner casing that forms a last stage of the steam turbine that addresses the problem of water erosion.

The present disclosure attempts to address this problem by means of the subject matter disclosed herein.

One general aspect provides welding a coating of cold work hardening stainless steel that is ductile and easily weldable to at least an erosion prone area of the inner casing. In service the coating work hardens as a result of water droplet impact, to form a hardened surface that is resistant to erosion. While it is known that aggressive surface treatment such as surface treatment with hard objects may work harden certain materials, the unexpected effect of work hardening by water droplets characteristically found in the flow path of a steam turbine provides an unexpected advantage of using work hardening materials to coat and/or repair water droplet eroded steam turbine inner casing components.

Another aspect provides an inner casing component configured to form part of a steam flow path of a last stage of an axial flow steam turbine, the steam turbine inner casing component having a base made of nodular cast iron and a coating, on the base, in a region exposed to the steam flow path, consisting of manganese austenitic steel, and more specifically a material defined by the code EN 1.4370, which is a work hardening steels.

In a further aspect, the last stage comprises a stationary vane row and a downstream rotating blade row wherein the coating is located in a region radially between the rotating blade row and the base.

Another general aspect provides a method for manufacturing an inner casing component, having a base, configured to form part of a steam flow path of a last stage of an axial flow low pressure steam turbine. The method comprising the step of applying a coating of manganese austenitic steel to the base in a region exposed to the steam flow path during operation.

In a further aspect, the coating is applied radially between a rotating blade row and the base.

In further aspect the method is suitable for repairing erosion damage of the base.

It is a further object of the invention to overcome or at least ameliorate the disadvantages and shortcomings of the prior art or else provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, embodiments of the present disclosure are described more fully hereinafter with reference to the accompanying drawing, in which:

FIG. 1 is a sectional view of a portion of a steam turbine to which an exemplary embodiment of the disclosure may be applied; and FIG. 2 is an expanded view of a section of FIG. 1 showing a coating of an exemplary embodiment.

DETAILED DESCRIPTION

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

FIG. 1 shows a section of an axial flow steam turbine to which exemplary embodiments may be applied. Shown is an inner casing component 10, a steam flow path 22 and a last stage 20 comprising a stationary vane row 16 and a downstream rotating blade row 18.

The inner casing component 10 forms a radial outer limit of the axial steam flow path 22, thereby in part defining the axial steam flow path 22. The inner casing component 10 may additionally provide a carrier means for carrying one or more stationary vane rows 16. As shown in FIG. 1, the inner casing component 10 may form only a portion of the inner casing of the steam turbine. That is, the inner casing component 10 is one component of several components. Alternatively, the inner casing component 10 may define the inner casing of the steam turbine.

As shown in FIG. 1, contained within the axial steam flow path 22 are stationary vane rows 16 that are each followed downstream, that is an axial direction corresponding to the nominal flow direction or working fluid through the flow path 22, by rotating blade rows 18. The last vane row 16/blade row 18 combination contained within the flow path 22 defines the last stage 20 of the turbine.

In an exemplary embodiment shown in FIG. 2, the inner casing component comprises a base 12 made of nodular cast iron and a coating 14 that is located on the base 12 in a region exposed to the steam flow path 22. The coating 14 consists of manganese austenitic steel, which, in an exemplary embodiment, is defined by the code EN 1.4370.

In an exemplary embodiment the coating 14 is located in a region radially between the rotating blade row 18 and the base 12, wherein the radial direction is defined at the direction perpendicular to the rotational axis of the rotating blade row 18.

Another exemplary embodiment relates to a method for manufacturing a steam turbine inner casing component 10 as shown in FIG. 2. The exemplary method involves applying a coating 14 of manganese austenitic steel to the base 12 in a region exposed to the steam flow path 22. In an embodiment, the region is a location radially between the rotating blade row 18 and the base 12.

In an exemplary embodiment, the application is by means of welding.

In further exemplary embodiment, the method is a method for repairing erosion damage of the base 12.

Although the disclosure has been herein shown and described in what are conceived to be the most practical exemplary embodiments, it will be appreciated that the present disclosure can be embodied in other specific ways.

For example, although one work hardening manganese austenitic steel has been described, the exemplary manganese austenitic steel may be substituted for other cold work hardening stainless steels adapted for the steam turbine application.

The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

What is claimed is:

1. An inner casing component configured to form part of a steam flow path of a last stage of an axial flow steam turbine, the inner casing component comprising:
    a base made of nodular cast iron; and
    a coating applied to the base in a region exposed to the steam flow path, the coating comprising manganese austenitic steel defined by code EN 1.4370.

2. The casing component of claim 1, wherein the last stage comprises a stationary vane row and a downstream rotating blade row, and wherein the region to which the coating is applied is radially between the rotating blade row and the base.

3. A method for manufacturing an inner casing component having a base configured to form part of a steam flow path of a last stage of an axial flow low pressure steam turbine, the method comprising the step of:
    applying a coating of manganese austenitic steel to the base in a region exposed to the steam flow path, the manganese austenitic steel being defined by code EN 1.4370.

4. The method of claim 3, wherein the last stage comprises a stationary vane row and a downstream rotating blade row; and wherein the step of applying the coating in the region exposed to the steam flow path comprises applying the coating to the inner casing component in a location radially between the rotating blade row and the base.

5. The method of claim 3, wherein the coating is applied by welding.

6. A method for repairing erosion damage of an inner casing component configured to form part of a steam flow path of a last stage of an axial flow low pressure steam turbine, the method comprising the step of:
    applying a coating of manganese austenitic steel to a base of the inner casing component in a region exposed to the steam flow path during operation of the steam turbine, the manganese austenitic steel being defined by code EN 1.4370.

* * * * *